United States Patent [19]

Reith et al.

[11] Patent Number: 5,203,973
[45] Date of Patent: Apr. 20, 1993

[54] METHOD OF ROUGHENING SURFACES

[75] Inventors: Heribert Reith, Stuttgart; Hans Lander, Pleidelsheim, both of Fed. Rep. of Germany

[73] Assignee: Robert Bosch GmbH, Stuttgart, Fed. Rep. of Germany

[21] Appl. No.: 875,546

[22] Filed: Apr. 27, 1992

Related U.S. Application Data

[63] Continuation of Ser. No. 806,477, Dec. 13, 1991.

[30] Foreign Application Priority Data

Dec. 22, 1990 [DE] Fed. Rep. of Germany ........ 4041577
Oct. 18, 1991 [DE] Fed. Rep. of Germany ........ 4134463

[51] Int. Cl.$^5$ ............................................. C25F 3/02
[52] U.S. Cl. .................................................. 204/129.75
[58] Field of Search ..................................... 204/129.75

[56] References Cited

U.S. PATENT DOCUMENTS 4,704,196 11/1987 Saito et al. ........................... 204/130
4,839,006 6/1989 Nakao et al. ......................... 204/130
4,844,781 7/1989 Sanchez et al. ...................... 204/132

OTHER PUBLICATIONS

Robert Bosch GmbH, *Automotive Handbook*, 2nd English Ed'n, 1986, pp. 1 & 434–435, esp. fig. captioned "Pre-engaged drive starter" showing brushes contacting commutator elements in motor.
Phillips 66 Company, Ryton V-1 . . . Polyphenylene Sulfide Data Sheet, 1989.

Primary Examiner—T. M. Tufariello
Attorney, Agent, or Firm—Frishauf, Holtz, Goodman & Woodward

[57] ABSTRACT

Carbon commutator parts used as races for brushes in electric motors are typically soldered to copper carriers. The solder does not bond well unless a metallic coating is first placed on the carbon part. To improve adhesion between the metallic coating and the carbon part, the surface must first be roughened. An improved method of roughening the surface involves immersing the carbon part in an aqueous solution of sodium hydroxide or potassium hydroxide, connecting the carbon part as an anode, and applying an electric current for two or three minutes. This produces oxidation on the surface of the pressed body, thereby roughening its surface, so that the solderable metallic coating will subsequently adhere much better.

17 Claims, 1 Drawing Sheet

METHOD OF ROUGHENING SURFACES

This application is a continuation of application Ser. No. 07/806,477, filed Dec. 13, 1991.

Cross-reference to related patent, the disclosure of which is incorporated by reference: U.S. Pat. No. 4,844,781, SANCHEZ et al.

FIELD OF THE INVENTION

The present invention relates generally to surface treatment of pressed graphite bodies and, more particularly, to electrochemical treatment in an alkaline solution in order to roughen the surfaces of the graphite bodies.

BACKGROUND

The term "pressed bodies" in the following description refers to filling-containing masses which are processed without tension into structural elements by compression, injection molding, and extrusion. Typical graphite pressed bodies are, for example, carbon commutators. For fastening of commutator lamella on the rotor of an electric motor, the carbon commutator is, for example, soldered to a metallic carrier. For that purpose, the carbon commutators are often provided with a solderable adhered metallic layer or coating, by means of which the carbon commutator is soldered to the carrier. For improved adhesion of the solderable metallic layer, pre-treatment of the surface of the pressed body is necessary. The previously known methods for pre-treatment of carbon commutators are mechanical roughening methods, e.g., sandblasting methods.

U.S. Pat. No. 4,844,781, SANCHEZ et al., discloses a method of surface treating carbon fibers in a substantially water-free solution of an amine compound in a bipolar solvent, preferably an aprotic bipolar solvent such as acetonitrile, dimethyl-formamide or dimethyl-sulfoxide ("DMSO"). This treatment leads to oxidation of the carbon fibers, which improves bonding between the fibers and an embedding matrix of synthetic resin. This bonding is a function of chemical processes which need not be detailed here.

SUMMARY OF THE INVENTION

It is an object of the present invention to improve adhesion of a metallic layer or coating applied to the surface of a graphite pressed or sintered body. The metal coating then facilitates attachment of the graphite body to a copper carrier.

Briefly, this is achieved by immersing the graphite body in an alkali metal containing aqueous solution, such as sodium hydroxide or potassium hydroxide, at a concentration of about 0.025 mol/liter to about 5 mol/liter, connecting the body as an anode, and running current through the thus-formed cell at a current density of greater than about 0.1 amperes/dm$^2$ (A/dm$^2$), preferably about 14 A/dm$^2$, for two or three minutes. The solution has a pH of greater than 12. The method is performed at a temperature of 10° C. to 110° C. This causes oxidation of some carbon and/or constituents of the binder, leading to sloughing off from the pressed body surface of oxidation products. This forms irregular cavernous depressions or roughening, into which the metallic coating can penetrate before it hardens. Much better adhesion results.

The method of the present invention is not only faster than prior art roughening methods, but also can be integrated into the chemical or galvanic process conventionally used to apply the metallic coating to the pressed body.

It is preferred to perform the method at room temperature of about 25° C., for two or three minutes, preferably for about 2.5 minutes and using a solution concentration of about 1 mol/liter. The treatment times set forth hereinabove apply to the entire method and preferably relate to the step of application of electrical current.

BRIEF DESCRIPTION OF THE DRAWING

The drawing is an elevational view in cross-section of an apparatus for carrying out the method of the invention.

DETAILED DESCRIPTION

Figure 1:
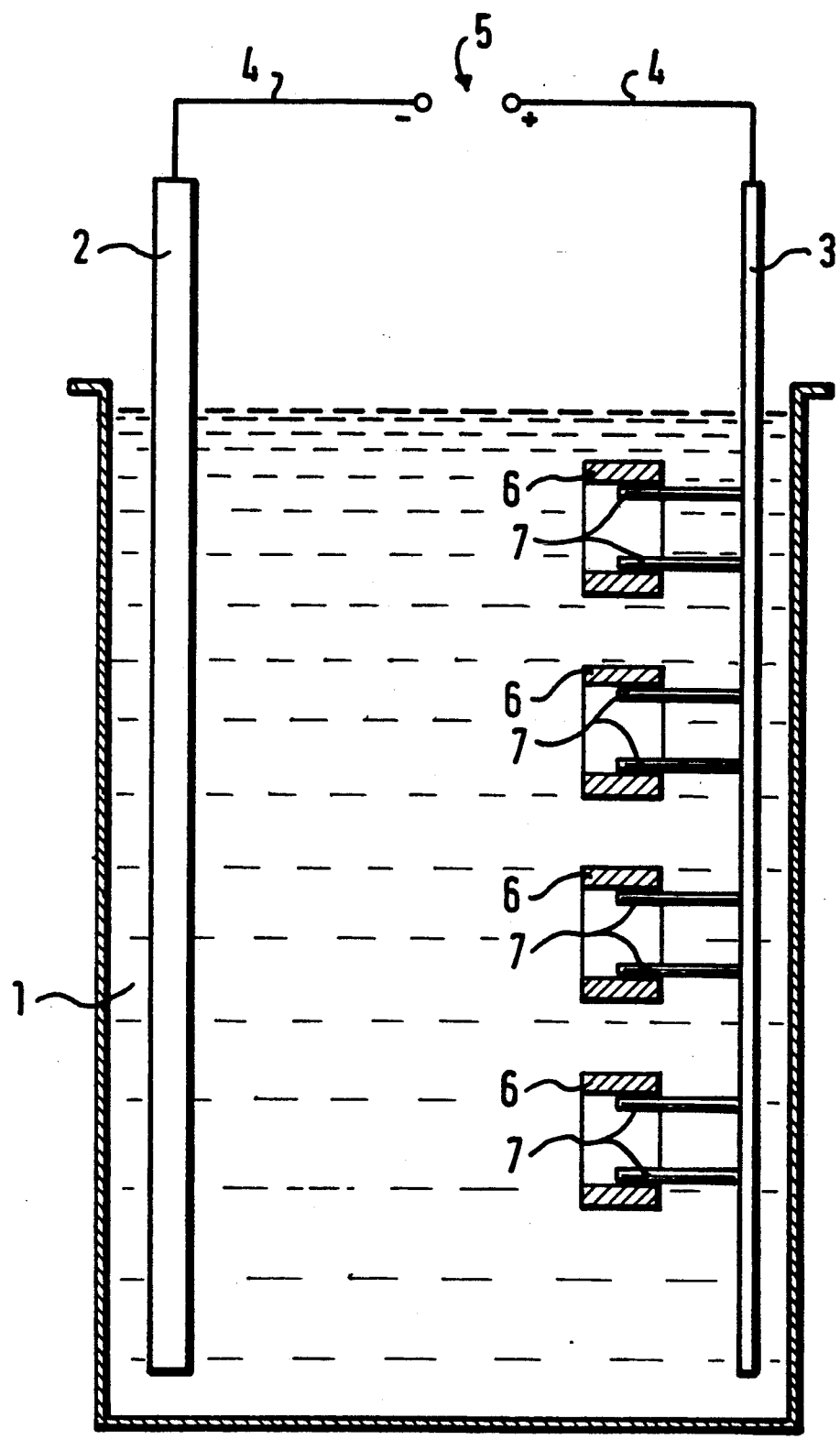

The invention will be explained with reference to a preferred use of the method, namely roughening the surface of a carbon part used in making an electrical commutator. Such carbon commutator parts serve as races or running surfaces for brushes in electric motors. The carbon commutators are generally attached to a copper body which serves as a compact carrier or substrate for the carbon commutator. A solderable adhered metallic layer is formed on the carbon commutator surface to which the copper carrier is to be attached. Solder is applied to the metallic layer, and, in a soldering step, the carbon commutator is soldered to the copper carrier. The carbon commutator of the present example is made by pressing or sintering a mixture of graphite and a binder. A suitable binder is polyphenylene sulfide (PPS), sold under the mark "RYTON" (U.S. Reg. No. 896,253 of Phillips Petroleum Co.). Specifically, "RYTON V-1" is employed. "RYTON V-1" is a powder coating product which is a "neat" resin of 100 wt. % PPS.

To improve adhesion of the metallic layer to the carbon commutator, it is necessary to roughen the surface on which the metallic layer is to be adhered. For roughening, the carbon commutator is electrochemically treated in an alkali metal containing bath, in which the commutator is connected as an anode.

The electrochemical treatment of the graphite pressed body oxidizes the carbon and/or other constituents of the binder, e.g. sulfur in the polyphenylene sulfide. This leads to sloughing off of the oxidation products from the surface of the graphite pressed body, so that cavernous recesses form on the surface. It is also within the scope of the inventive concept that the sloughing off of the oxidation products could lead to ejection of non-anodizable particles, and that those places could instead form the cavernous depressions. These cavernous depressions form engagement points for the metallic layer, analogous to press-studs or "moly" bolts, all over the interface between the graphite pressed body and the metal layer.

After the electrochemical treatment, the carbon commutator is subjected to the usual various cleaning steps. Subsequently, the metallic layer or coating is applied by conventional means to the carbon commutator surface, which is later intended to fasten to the copper carrier. The apparatus for carrying out the method of the present invention is a conventional electrolysis bath. The drawing illustrates this apparatus.

In the drawing, an alkaline solution (NaOH- or KOH-solution) forms an electrolyte 1. In electrolyte 1 are a cathode rod 2 and an anode rod 3, which are connected by electrical leads 4 to a constant voltage source 5. On the anode rod 3 are multiple brackets 7, onto each of which is disposed a carbon commutator 6. Between carbon commutator 6, bracket 7, and anode rod 3, there is an electrical connection. To prevent bracket 7 and anode rode 3 from being attacked by an oxidation reaction occurring on at the anode, they are made of a resistant metal, e.g., titantium, niobium, or tantalum. To prevent attack by a reduction reaction at the cathode, cathode rod 2 is made of iron, stainless steel, or titanium.

EXAMPLES

Example 1

A pressed graphite body formed with a binder and a metal additive is immersed in a sodium hydroxide solution (NaOH concentration is 1 mol/liter). The graphite body is connected as an anode and a direct current is run through the thus-formed cell at a current density of 14 A/dm$^2$ for two to three minutes at a temperature of 25° C. The conditions for Example 1 are summarized as follows:

Solution: NaOH, concentration 1 mol/liter
Current: direct, with density 14 A/dm$^2$
Temperature: 25° C.
Time period: 2.5 minutes

Example 2

Example 2 is carried out in the same manner as Example 1, except a potassium hydroxide solution is used instead of the sodium hydroxide solution. The conditions for Example 2 are summarized as follows:

Solution: KOH, concentration 1 mol/liter
Current direct, with density 14 A/dm$^2$
Temperature: 25° C.
Time period: 2.5 minutes Various changes and modifications are possible within the scope of the inventive concept.

We claim:

1. A method for surface treatment of a pressed graphite body formed with a binder and a metal additive, comprising immersing said pressed body in an alkali metal containing solution, wherein said alkali metal is selected from the group consisting of sodium and potassium, said solution having a pH greater than 12, and
   applying an electric current to a surface of said pressed body, acting as an anode, to electrochemically treat the same.

2. The method of claim 1, wherein said alkali metal containing solution is selected from the group consisting of a sodium hydroxide solution and a potassium hydroxide solution.

3. The method of claim 1, wherein the concentration of said solution is between about 0.025 mol/liter and about 5 mol/liter.

4. The method of claim 1, wherein the concentration of said solution is about 1 mol/liter.

5. The method of claim 1, wherein said applying of an electric current comprises applying a direct current.

6. The method of claim 1, wherein said applying of an electric current comprises applying a current having a current density greater than 0.1 amperes/dm$^2$.

7. The method of claim 1, wherein said applying of an electric current comprises applying a current having a current density of about 14 amperes/dm$^2$.

8. The method of claim 1, wherein said method is performed at a working temperature between about 10° C. and about 100° C.

9. The method of claim 1, wherein said method is performed at a working temperature of about 25° C.

10. The method of claim 1, wherein said applying of said electric current is performed for a period between about 0.05 and about 20 minutes.

11. The method of claim 1, wherein said applying of said electric current is performed for a period of about 2.5 minutes.

12. The method of claim 1, wherein said solution is a sodium hydroxide solution of a concentration of 0.025 mol/liter to 5 mol/liter.

13. The method of claim 12, wherein the current is a direct current at a current density of greater than 0.1 amperes/cm$^2$; and the method is carried out at a temperature of 10° C. to 100° C.; and the applying of said electric current is performed for a period of time of 0.05 minutes to 20 minutes.

14. The method of claim 13, wherein the concentration of said solution is about 1 mol/liter; the temperature is about 25° C.; the period of time is about 2.5 minutes; and the current density is about 14 amperes/cm$^2$.

15. The method of claim 1, wherein said solution is a potassium hydroxide solution of a concentration of 0.025 mol/liter to 5 mol/liter.

16. The method of claim 15, wherein the current is a direct current at a current density of greater than 0.1 amperes/cm$^2$; and the method is carried out at a temperature of 10° C. to 100° C. and for a period of time of 0.05 minutes to 20 minutes.

17. The method of claim 16, wherein the concentration of said solution is about 1 mol/liter; the temperature is about 25° C.; the period of time is about 2.5 minutes; and the current density is about 14 amperes/cm$^2$.

* * * * *